US012185360B2

(12) United States Patent
(10) Patent No.: US 12,185,360 B2
(45) Date of Patent: Dec. 31, 2024

Skov et al.

(54) PROCESSING RULES FOR RESOURCE ELEMENTS

(71) Applicant: NOKIA SOLUTIONS AND NETWORKS OY, Espoo (FI)

(72) Inventors: Peter Skov, Valby (DK); Dmitry Demianchik, Saint Petersburg (RU); Krzysztof Kurnicki, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 341 days.

(21) Appl. No.: 17/798,258

(22) PCT Filed: Feb. 13, 2020

(86) PCT No.: PCT/RU2020/000070
§ 371 (c)(1),
(2) Date: Aug. 8, 2022

(87) PCT Pub. No.: WO2021/162573
PCT Pub. Date: Aug. 19, 2021

(65) Prior Publication Data

US 2023/0070917 A1 Mar. 9, 2023

(51) Int. Cl.
*H04W 72/56* (2023.01)

(52) U.S. Cl.
CPC .................................. *H04W 72/56* (2023.01)

(58) Field of Classification Search
CPC .................................................... H04W 72/56
See application file for complete search history.

(56) References Cited

U.S. PATENT DOCUMENTS

| | | | |
|---|---|---|---|
| 11,316,720 B2 * | 4/2022 | Rama Chandran | H04L 27/2646 |
| 11,418,239 B2 * | 8/2022 | Vijayan | H04L 25/03006 |
| 11,431,422 B2 * | 8/2022 | Hong | H04L 25/0202 |
| 11,516,721 B1 * | 11/2022 | Kuppuswamy | H04W 40/02 |
| 2016/0338127 A1 | 11/2016 | Matsumoto et al. | |
| 2019/0090159 A1 | 3/2019 | Zhou | |
| 2019/0289497 A1 * | 9/2019 | Rajagopal | H04B 7/0456 |
| 2019/0313287 A1 | 10/2019 | Li | |
| 2019/0357209 A1 | 11/2019 | Liu et al. | |

(Continued)

FOREIGN PATENT DOCUMENTS

| | | |
|---|---|---|
| CN | 110249681 A | 9/2019 |
| CN | 110582973 A | 12/2019 |

(Continued)

OTHER PUBLICATIONS

1st Office Action & Search Report, Chinese Patent Application No. 202080096342.1, Jan. 17, 2024, 6 pages.

(Continued)

*Primary Examiner* — Adam D Houston
(74) *Attorney, Agent, or Firm* — Tong, Rea, Bentley & Kim, LLC

(57) ABSTRACT

A fronthaul control plane message comprises three or more control plane sections for channels within a resource element range, at least two of which control plane sections are applicable at least in one of resource elements within the resource element range, and the control plane sections comprise or indicate priority information, based on which one of the control plane sections may be selected to be used in a resource element.

14 Claims, 5 Drawing Sheets

(56) References Cited

U.S. PATENT DOCUMENTS

| | | | | |
|---|---|---|---|---|
| 2019/0369201 | A1 | 12/2019 | Akkarakaran | |
| 2020/0128496 | A1 * | 4/2020 | Rama Chandran | H04W 52/16 |
| 2021/0120531 | A1 * | 4/2021 | Jeon | H04B 7/088 |
| 2021/0314978 | A1 * | 10/2021 | Kuczynski | H04W 72/23 |
| 2021/0410007 | A1 * | 12/2021 | Rajagopal | H04B 7/0456 |
| 2023/0057921 | A1 * | 2/2023 | Sundaram | H04L 5/0023 |
| 2023/0070917 | A1 * | 3/2023 | Skov | H04W 72/56 |
| 2024/0276586 | A1 * | 8/2024 | Lee | H04W 76/27 |
| 2024/0284206 | A1 * | 8/2024 | Elshafie | H04W 24/10 |

FOREIGN PATENT DOCUMENTS

| | | | | | |
|---|---|---|---|---|---|
| CN | 115777222 | A | * | 3/2023 | H04L 27/18 |
| FI | 20205354 | A1 | * | 10/2021 | |
| KR | 20230071674 | A | * | 5/2023 | |
| KR | 20240026806 | A | * | 2/2024 | |
| WO | 2019033072 | A1 | | 2/2019 | |
| WO | WO 2020/080838 | A1 | | 4/2020 | |
| WO | WO 2020/109892 | A1 | | 6/2020 | |
| WO | WO-2021112730 | A1 | * | 6/2021 | H04W 24/02 |
| WO | WO-2021162573 | A1 | * | 8/2021 | H04W 16/28 |
| WO | WO-2024167527 | A1 | * | 8/2024 | H04W 72/1215 |

OTHER PUBLICATIONS

Qualcomm Incorporated, "DL and UL NR Positioning Procedures," 3GPP TSG-RAN WG2 Meeting #107bis, Chongqing, China, Oct. 14-18, 2019, R2-1913395, Revision of R2-1909416, 53 pages.

Intellectual Property India, Examination Report, Application No. 202217045932, Oct. 17, 2023, 6 pages.

International Search Report and Written Opinion mailed in corresponding PCT Application No. PCT/RU2020/000070 on Oct. 28, 2020, 17 pages.

* cited by examiner

PROCESSING RULES FOR RESOURCE ELEMENTS

CROSS-REFERENCE TO RELATED APPLICATIONS

This application is based on and claims the benefit of International Patent Application No. PCT/RU2020/000070, filed on Feb. 13, 2020, which is hereby incorporated herein by reference in its entirety.

TECHNICAL FIELD

Various example embodiments relate to fronthaul wireless communications.

BACKGROUND

Wireless communication systems are under constant development. One example is a radio access network fronthaul architecture, in which multiple remote units, for example remote radio heads, are serviced by a single central unit, for example by a baseband unit. User data and control data are transmitted over a connection between a remote unit and the central unit. The control data may be used to communicate processing rules, including configuration information, for example beamforming configuration, which to apply in the remote unit for resource elements transmitted over the air.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides a radio unit comprising at least one processor; and at least one memory including computer program code, the at least one memory and computer program code configured to, with the at least one processor, cause the radio unit at least to perform: identifying, in response to receiving data to be transmitted, a resource element allocated for transmission of the data within a resource element range, the identifying including determining position of the resource element in a resource grid; determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane section; processing data according to one or more processing rules defined in the control plane section; and causing sending the data.

In an embodiment, the at least one memory and computer program code configured to, with the at least one processor, cause the radio unit further to perform: creating, in response to receiving the fronthaul control plane message, for resource elements within the resource element range, a selection table, the selection table comprising for a resource element information on the one or more processing rules to apply, the one or more processing rules being determined by using the control plane section applicable in the resource element, or, if there are two or more control plane sections applicable in the resource element, one of the two or more control plane sections, the one being selected based on the priority values indicated in the two or more control plane section; and storing to the selection table information indicating the one or more processing rules; wherein the determining, based on the position and a received fronthaul control plane message, comprises determining the control plane section by selecting the one or more processing rules from the selection table based on the position.

In an embodiment, the at least one memory and computer program code configured to, with the at least one processor, cause the radio unit further to perform: using the indicated priority values to select the one of the two or more control plane sections that has the highest priority value.

In an embodiment, the at least one memory and computer program code configured to, with the at least one processor, cause the radio unit further to perform: using a default priority value if a control plane section does not comprise a priority value.

In an embodiment, the one or more processing rules indicate beamforming configuration to be used.

An aspect provides an apparatus comprising at least one processor; and at least one memory including computer program code, the at least one memory and computer program code configured to, with the at least one processor, cause the apparatus at least to perform: causing sending from the apparatus fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

In an embodiment, the at least one memory and computer program code configured to, with the at least one processor, cause the apparatus further to perform: creating a control plane section for a control data channel within the resource element range and one or more control plane sections for one or more user data channels within the resource element range, wherein the control plane section for the control data channel is applicable at least in one of the resource elements in a control plane section for a user data channel.

In an embodiment, the at least one memory and computer program code configured to, with the at least one processor, cause the apparatus further to perform: adding the priority value as an argument to a field in a section extension type 6 of the control plane section.

In an embodiment, combinable with any previous embodiment or aspect, the control plane sections comprise the same section identifier.

An aspect provides a method for a radio unit, the method comprising: identifying, in response to receiving data to be transmitted, a resource element allocated for transmission of the data within a resource element range, the identifying including determining position of the resource element in a resource grid; determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane section; processing data according to one or more processing rules defined in the control plane section; and causing sending the data.

An aspect provides a method for an apparatus, the method comprising: causing sending from the apparatus fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

An aspect provides a computer program comprising instructions which, when the program is executed by one or more processors, cause the one or more processors to carry out at least: identifying, in response to receiving data to be transmitted, a resource element allocated for transmission of the data within a resource element range, the identifying including determining position of the resource element in a resource grid; determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane section; processing data according to one or more processing rules defined in the control plane section; and causing sending the data.

An aspect provides a computer program comprising instructions which, when the program is executed by one or more processors, cause the one or more processors to carry out at least: causing sending fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

An aspect provides a non-transitory computer-readable storage medium storing one or more instructions which, when executed by one or more processors, cause the one or more processors to carry out at least: identifying, in response to receiving data to be transmitted, a resource element allocated for transmission of the data within a resource element range, the identifying including determining position of the resource element in a resource grid; determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane section; processing data according to one or more processing rules defined in the control plane section; and causing sending the data.

An aspect provides a non-transitory computer-readable storage medium storing one or more instructions which, when executed by one or more processors, cause the one or more processors to carry out at least: causing sending fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

An aspect provides a radio unit comprising means for performing: identifying, in response to receiving data to be transmitted, a resource element allocated for transmission of the data within a resource element range, the identifying including determining position of the resource element in a resource grid; determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane section; processing data according to one or more processing rules defined in the control plane section; and causing sending the data.

An aspect provides an apparatus comprising means for performing: causing sending fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

An aspect provides an electromagnetic signal for encoding information comprising three or more control plane sections for channels within a resource element range, at least two of which control plane sections are applicable at least in one of resource elements within the resource element range, and at least one of the control plane sections comprises a priority value.

In an embodiment, the electromagnetic signal is transmitted over a fronthaul interface to a radio unit.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
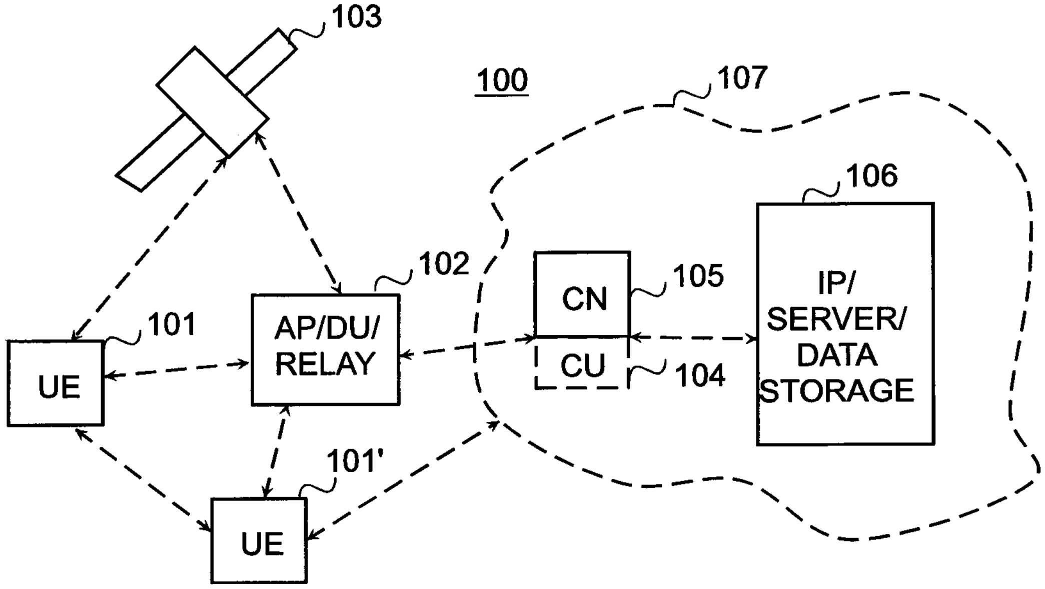
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (LAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
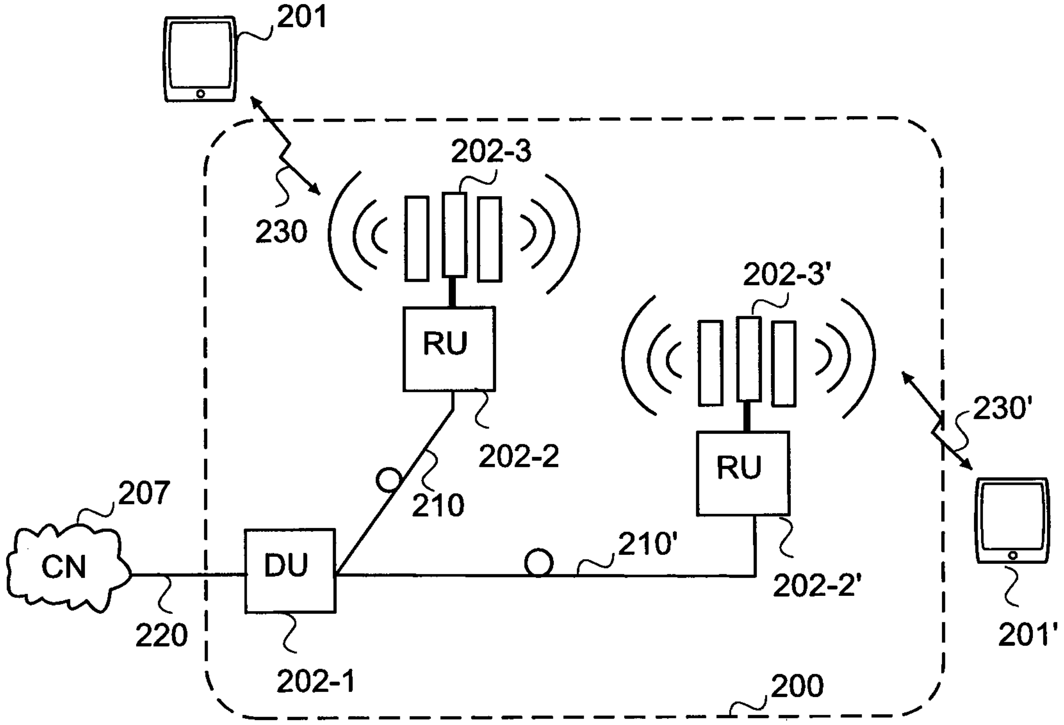
FIG. 2 illustrates an example of fronthaul architecture.

FIG. 2 illustrates a simplified example of a wireless system, which is configured to comprise a fronthaul radio access network 200. It should be appreciated that FIG. 2 only shows some apparatuses/units to illustrate the fronthaul radio access network 200. It is apparent to a person skilled in the art that the systems also comprise other equipment, functional entities and apparatuses, and any number of illustrated apparatuses/units.

In the fronthaul radio access network 200 base station functionalities are distributed between a distributed unit DU 202-1 and a radio unit RU 202-2, 202-2'. The distributed unit may be called a baseband unit and the radio unit may be called a remote radio head.

The distributed unit 202-1 and the one or more radio units 202-2, 202-2' of the distributed unit are connected with a connection 210, 210' over which user data and control data are transmitted. The connection 210, 210' may be an optical fiber connection but any other types of connections, for example microwave, may be used as well. The distributed unit 202-1 is further connected over a connection 220 to a core network 205, or have backhaul connections towards the core network in a centralized radio access network architecture. The radio unit 202-2, 202-2' comprises one or more radio antennas 202-3, 202-3' via which wireless connections 230, 230' to user devices 201, 201' (user apparatuses) are established.

The connection 210, 210' between the distributed unit 202-1 and the radio unit 202-2, 202-2' provides a fronthaul interface over which control data and user data is transmitted, using, for example, a protocol currently being defined by O-RAN Alliance.

Figure 3:
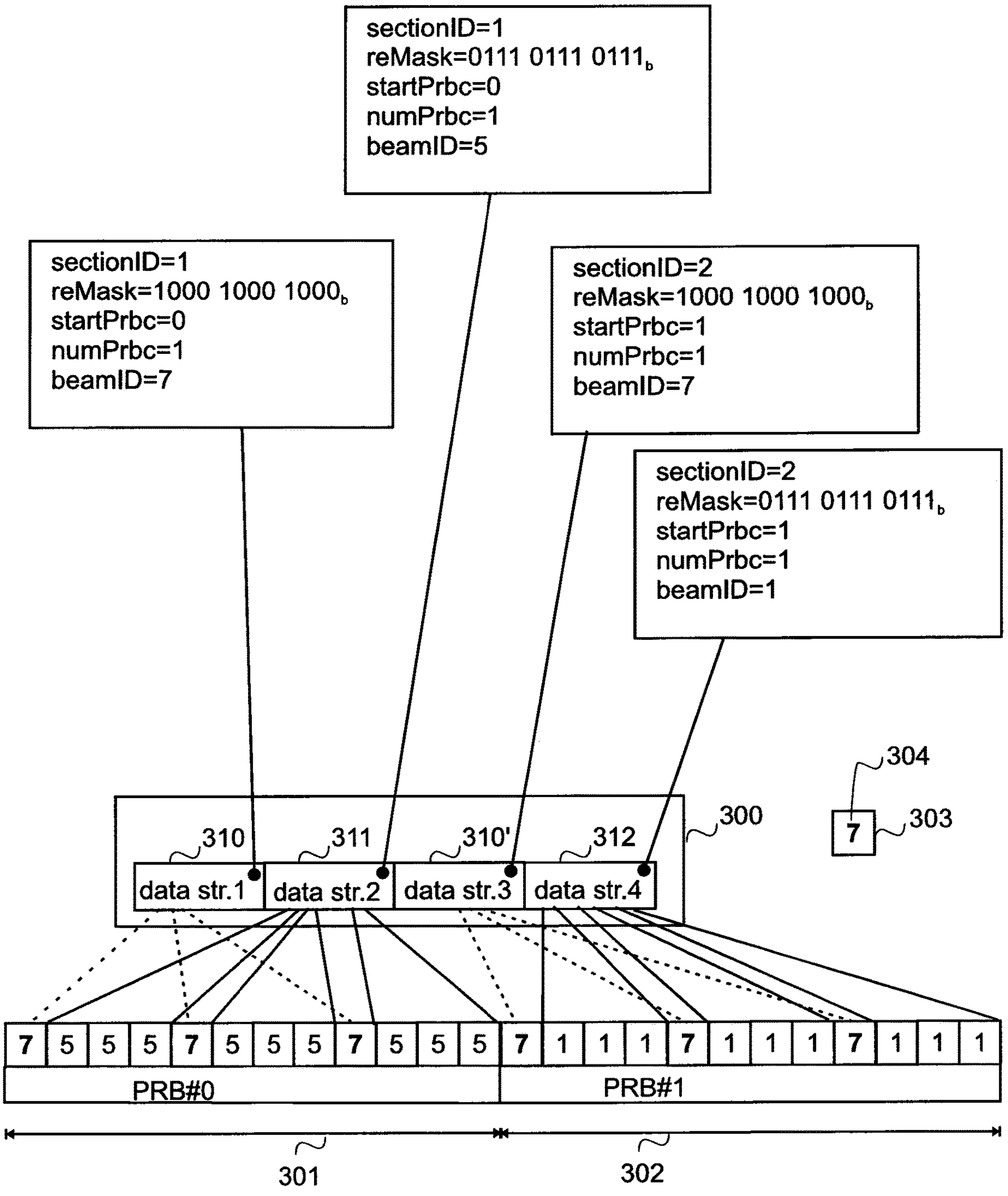
FIGS. 3 and 4 illustrate examples of control plane messages.
Figure 4:
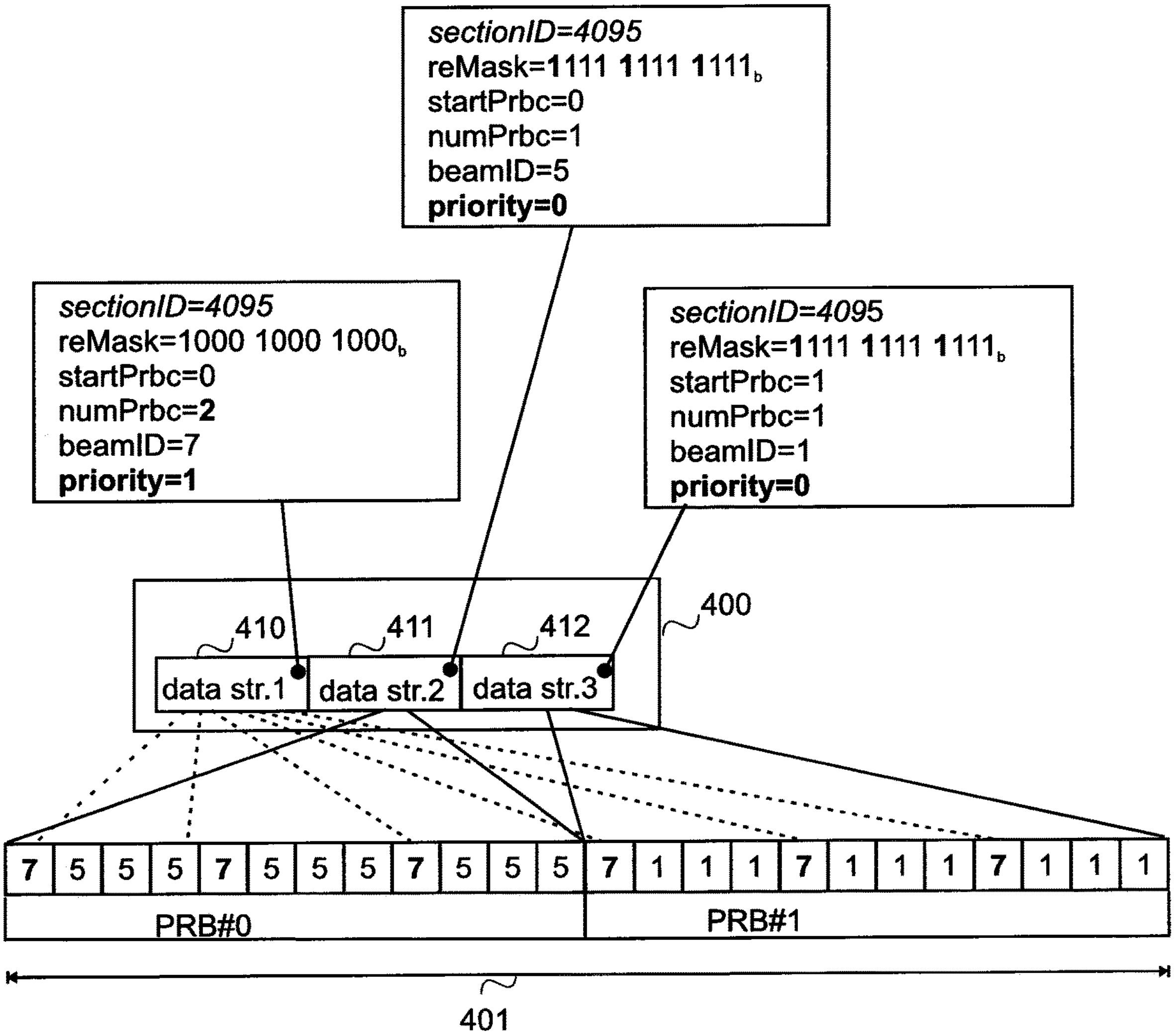

FIGS. 3 and 4 illustrate simplified examples of data structures for control plane data sent over the fronthaul interface, the control plane data defining how to process data to which resources are allocated over the wireless connection. In the examples, it assumed, for illustrative purposes only, that there is user data to be sent towards a user device 1, and user data to be sent towards a user device 2, and that beamforming configuration is partitioned to three different beamforming configuration 1, 5 and 7 over the spectrum. As is known, a resource element, illustrated in FIG. 3 also as a separate element 303, is an element in a resource grid, which comprises a plurality of resource elements in time and frequency domain. The resource element is identified uniquely by its index in the frequency domain and symbol position in the time domain. A physical resource block PRB contains twelve consecutive resource elements in the frequency domain, as illustrated in FIGS. 3 and 4. A section in turn contains a set of physical resource blocks in the frequency domain occurring at same symbol.

In the illustrated examples it is assumed that a physical resource block PRB #0 is allocated for user data channel to the user device 1 and a physical resource block PRB #1 is allocated for user data channel to the user device 2, except those resource elements that are allocated for the control channel. In the illustrated examples of FIGS. 3 and 4 it is assumed that every fourth resource element is reserved for control channel over which static control data, such as cell reference signal, for example, may be sent, without limiting the disclosure to such a solution. It should be appreciated that any other spectrum allocation may be used as well.

The control plane data is sent in information elements, that may be called section descriptions, section headers, control section descriptions, data structures, control data structures, or control plane sections. Herein term "control plane section" is used. The control plane section comprises a predefined set of arguments, i.e. a predefined set of control data items, that convey, among other things, processing rules for resource elements, such as beamforming configuration information or precoding parameters, for example. (The processing rules describe actions to be. Another example of a processing rule is which precoding parameters is to be used. However, in the examples below, the beamforming configuration is used as an example of processing rules, for the sake of clarity and without limiting the examples to the one processing rule. Other information the control plane section, or more precisely the arguments (parameters/fields) conveys include information with which resource elements can be identified, and to which resource elements the processing rules defined in the control plane section are applicable. It should be appreciated that only some of the arguments (mandatory and optional) a control plane section actually includes are illustrated in the control plane sections in FIGS. 3 and 4.

FIG. 3 illustrates a solution in which a unique section identifier is assigned to each section that is allocated to a different user channel (user device) and resources that are allocated to control channel(s) or control signal(s) within the section should also be identified using the unique section identifier. This means that a separate control plane section for each continuous block in the section is transmitted over the fronthaul interface.

In the extremely simplified example of FIG. 3, there are two sections 301, 302, identified by section identifiers 1 and 2, correspondingly. In the illustrated example, the two sections 301, 302 contain both control channels for the static control data and user data channels; section 301 for the user device 1 and section 302 for the user device 2. A control plane message 300 for the two sections comprises four control plane sections 301, 302, 301', 304: for each section a control plane section 301, 301' defining a beamforming configuration to be used, for example, for the cell reference signal (static control data) and a control plane section 302, 304 defining a beamforming configuration to be used, for example, for the corresponding user data.

Further, as said above, in the simplified FIG. 3, only one physical resource block in a section 301, 302 is illustrated. In the example of FIG. 3, the resource elements 303 in the physical resource blocks each contain a number 304 indicating a beamforming configuration to be used for the resource element 303.

In the illustrated example of FIG. 3, the control plane section 310 for the first section 301 defines that it is to be used within the section 301, identified by the value 1 of the field argument for the section identifier in the control plane section 310, for resource elements 0, 4 and 8, as defined by the value of reMask argument, and the beamforming configuration to be used is defined by the value of beamID argument, the value being 7. The control plane section 311 for the first section 301 defines that it is to be used within the section 301, identified by the value 1 in the control plane section 311, for resource elements other than 0, 4 and 8, as defined by the value of reMask argument, and the beamforming configuration to be used is defined by the value of beamID argument, the value being 5. The control plane section 310' for the second section 302 defines that it is to be used within the section 302, identified by the value 2 in the control plane section 310', for resource elements 0, 4 and 8, as defined by the value of reMask argument, and the beamforming configuration to be used is defined by the value of beamID argument, the value being 7. In other words, the only difference between control plane sections 310 and 310' is the value of the section identifier. The control plane section 312 for the second section 302 defines that it is to be used within the section 302, identified by the value 2 in the control plane section 312, for resource elements other than 0, 4 and 8, as defined by the value of reMask argument, and the beamforming configuration to be used is defined by the value of beamID argument, the value being 1.

In other words, a pair of control plane sections per section is needed to inform a radio unit how to process resource elements within the section. Hence, in the illustrated example two pairs of control plane sections are needed to inform the radio unit how to process resource elements in section 301 and 302. The first pair of 310 and 311 have the same values for prbStart and prbNum and sectionID but different reMask values, to identify resource elements within the section that should be beamformed using the corresponding beamforming configuration (beam identifier 7 for the control channel and beam identifier 5 for the user data channel). The same applies to the second pari of 310' and 312. Further, the control plane sections convey information that in the example each user plane section has a length of one physical resource block (numPrb=1).

For the example of FIG. 3, two user plane sections, not illustrated in FIG. 3, will be sent: one user plane section with header information comprising as a value for the section identifier argument the value 1 so that the radio unit can find the processing rules delivered in control plane sections 310, 311 to transmit user data over the wireless connection to the user device 1, and one user plane section with header information comprising as a value for the section identifier argument the value 2 so that the radio unit can find the processing rules delivered in control plane sections 310', 311 to transmit user data over the wireless connection to the user device 2.

Altogether for the simplified example of FIG. 3, six information elements need to be transmitted over the fronthaul interface: two user plane sections and four control plane sections, two of which defines rules for user data channels and two for control channels (static control data, reference signals).

FIG. 4 illustrates another solution, for the same extremely simplified example as FIG. 3. In the solution illustrated by means of FIG. 4, no unique section identifier is used, a single user plane section 401 can be used for contiguous physical resource block range allocated for multiple user data channels (user devices).

In the illustrated example of FIG. 4, one control plane section 410 provides beamforming configuration information of overlapping control channel(s), for example, and the other two control plane sections 411, 412 provide beamforming configuration information of user data channels (one per user data channel/user device).

The illustrated control plane sections 410, 411, 412 contain as a section identifier (sectionID) the same, predefined constant value, just to illustrate that the section identifier is not used for conveying beamforming configuration information, or other rules. It should be appreciated that the section identifier may be used for other purposes, in which case its value may change. Further, it should be appreciated that, in case the section identifier is not used for any purpose, there can be control plane sections not having any value for the section identifier, or not even a field for the section identifier.

In the illustrated example of FIG. 4, a field named "priority" is used for indicating processing rules. In other words, the value of the field is used to determine which rule to apply in case there are two or more control plane sections that cover the same resource element, or the same resource element area, as will be described in detail below. The field "priority" may be added into a section extension type 6 of the control plane section. Naturally the field may be named differently, and any other values, for example −1, 0 and 1 or 0, 1, 2, 3, 4 and 5, or verbal expression, such as "lower than default", or indication of channel type (control channel/user data channel) for which resources are allocated, may be used to indicate the preference of the control plane sections, and thereby the processing rules, such as beamforming configuration, to be applied. In another example, if no field "priority" is added to a control plane section, or if no section extension type 6 is included to the control plane section, this may indicate that a default value is to be used. For example, the control plane section 410 may contain mere field "priority" which indicates value 1, and the control plane sections 411 and 412 may contain no field "priority" which indicates value 0. In another example the control plane section 410 may be as illustrated in FIG. 4, but the control plane sections 411 and 412 may contain no field "priority", or the value of the field "priority" is empty, meaning that a default priority value 0 is used. Further, it should be appreciated that instead of selecting the one with the highest priority, other selection rules may be used, one example being that the one with the lowest priority value is selected.

Further, in the illustrated example, the value in a field "numPrbc" indicates the number of consecutive physical resource blocks the section description is to be used. In the illustrated example, the section description 410 is to be used for static control data, such as the cell reference signal, whereas the control plane sections 411 and 412 are to be used for user data channels (user devices) in one section, the control plane section 411 for the user device 1 and the control plane section 412 for the user device 2.

For the example of FIG. 4, as said above, one user plane section, not illustrated in FIG. 4, will be sent. As explained below in detail, the radio unit can find the processing rules delivered in control plane sections 410, 411, 412 to transmit user data over the wireless connection to the user device 1 and to transmit user data over the wireless connection to the user device 2, processing the data in the same way as in the solution disclosed in FIG. 3.

As can be seen, no pairs of control plane sections are formed, and for user data channels (control plane sections 411, 412), no special reMask value is used, instructing the radio unit to use for all resource elements for user data channel to the user device 1 beamforming configuration with the beam identifier 5, and correspondingly all resource elements for user data channel to the user device 2 beamforming configuration with the beam identifier 1. However, since there is the control plane section 410 with the priority value 1, and this is to be used within a physical resource block range comprising two physical resource blocks (numPrcp=2), the radio unit is instructed to exclude resource elements indicated (selected) in the control plane section 410 (highest priority), and to apply beamforming configuration indicated in the control plane section 410 to them, i.e. within the physical resource block range allocated to by both (all) user channels.

Altogether for the simplified example of FIG. 4, four information elements need to be transmitted over the fronthaul interface: one user plane section and three control plane sections, two of which defines processing rules for user data channels and one defines processing rules for control channels.

Comparing the solutions of FIGS. 3 and 4, the solution in FIG. 4 avoids redundancy (only three control plane sections required instead of the four in the solution of FIG. 3—in real life, for example when 20 user channels are used, the solution in FIG. 3 may require 200 control plane sections to instruct the radio unit how to process data transmission, whereas the solution in FIG. 4 may require 25 control plane sections to convey the same processing instructions to the radio unit). Further, the solution of FIG. 4 provides a control plane optimization since the field "priority" allows to prepare (create) a single section for a user channel (user device), without preparing distinct sections for symbols with and without control channel (channel reference signals), as indicated by the value in reMask field in FIG. 4. In addition, the solution of FIG. 4 provides user plane optimization, since not using the section identifier, it is possible to combine user data sections that are allocated to different user channels (user devices) but allocated in the contiguous physical resource blocks into single sections. In other words, data of different channels may be transferred over the fronthaul interface in a single user plane section. This means decrease in the number of user plane sections (less redundancy caused by header information, for example).

Figure 5:
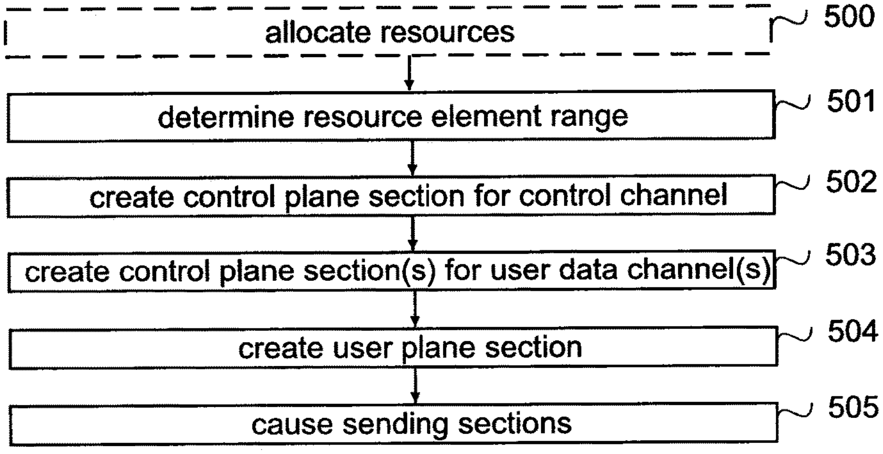
FIGS. 5, 6, 7 and 8 are flow charts illustrating different examples of functionalities.

FIG. 5 is a flow chart illustrating an example functionality of the distributed unit when the solution disclosed in FIG. 4 is used. In the example of FIG. 5, it is assumed that resources for data transmission has been allocated (block 500), and other scheduling information determined, including processing rules. For the example used in FIG. 4 this means that the user data channel to the user device 1 is allocated to the physical resource block PRB #0 (all 12 resource elements) with beamforming configuration 5, the user data channel to the user device 2 is allocated to the physical resource block PRB #1 (all 12 resource elements) with beamforming configuration 1, and the control channel is allocated to the whole bandwidth (which is in the example two physical resource blocks) in the specified symbols to specific resource elements.

Referring to FIG. 5, the process starts in block 501, where the distributed unit determines a resource element range, within which range all resource elements are to be processed with the same rule. In other words, also in case more than one user data channel is allocated in such a way that the same processing rules (in the example same beamforming configuration) is to be used, the range should include ranges allocated to all user channels (user devices) for which the same processing rules are to be used.

Then a control plane section is created (prepared) in block 502 for the static control data, i.e. for a control channel to cover the resource element range with priority value assigned for static control data and with beamforming configuration value (beamID) to be applied to resource elements allocated for control channels. In other words, the control plane section corresponding to 410 in FIG. 4 is created.

Then, or at the same time or prior block 502, control plane section(s) for user data channels (for user devices), are created (prepared) in block 503. The resource element range of a user data channel and it is for resource elements which are to be processed using the same beamforming configuration indicated by the same value (the same beamID value). The resource element range is specified via values given to argument fields symbolMask, and rbgMask, the symbolMask indicating symbols within a slot that are allocated to the user device (user data channel) and rgbMask indicating physical resource blocks within a symbole that are allocated to the user device. (This actually means a single section per user devices (user data channels) that use the same beamforming configuration, i.e. have the same beamID value, per subframe.) In other words, control plane section(s) corresponding to 411, 412 are created.

The above process discloses that a control plane message is created that comprises three or more control plane sections, at least two of which are applicable at least in one resource element, and the control plane sections comprise a priority value or indicate a priority.

Also user plane sections are created (prepared) in block 505 in such a way that a single user plane section is created per every contiguous physical resource block range in the frequency domain, In the example based on FIG. 4, the two physical resource blocks are contiguous, and only one user plane section with range 2 is created. Further, sending of the control plane sections and the user plane section(s) is caused in block 506. The sending of the control plane sections usually takes place before sending the user plane sections.

Figure 6:
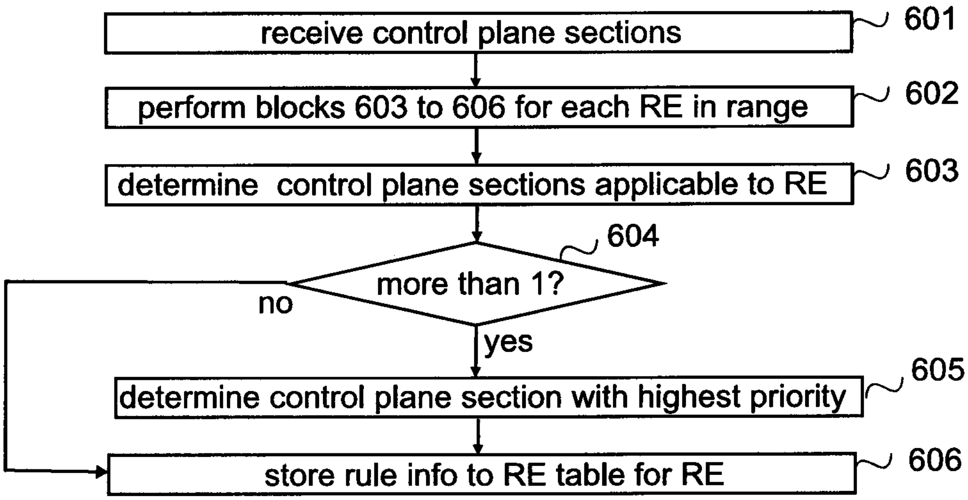
Figure 7:
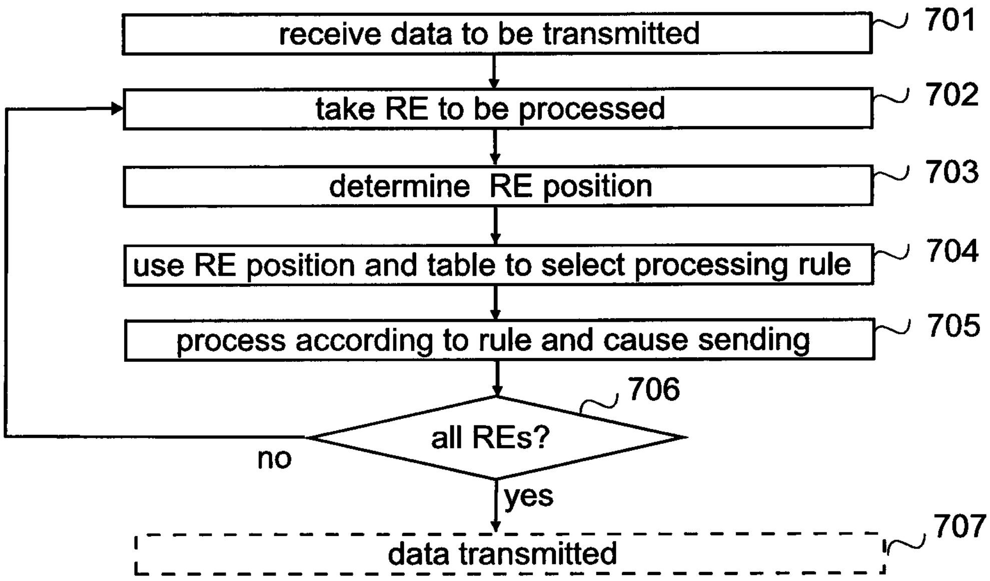

FIGS. 6 and 7 illustrated example functionalities of a radio unit according to an implementation, FIG. 6 processing of control plane sections and FIG. 7 processing user plane data, when the solution disclosed in FIG. 4 is used.

Referring to FIG. 6, when the radio unit receives in block 601 control plane sections, it uses the information to create/update a table (search table) for resource elements in such a way that the value/values in the table can be used for determining control plane section and/or for beamforming configuration, and/or another processing rule to apply for the resource element. Therefore the radio unit performs (block 602) following for each resource element (RE) in the resource element range indicated in the control plane sections processed. Firstly, all control plane sections applicable to the resource element are determined in block 603. (In other words, all control plane sections within which resource element range the resource element locates are determined.) If there are more than one control plane sections applicable (block 604: yes), the priority values in the control plane sections, or indicated by the control plane section, are used in block 605 to determine (select) the control plane section having the highest priority value. In other words, it is determined which processing rule is to be applied. Then the processing rule, for example use beamforming configuration identified by beamID value, or the beamID value, is stored in block 606 to the table for later use. The table may be maintained in the memory as long as corresponding resource elements have not yet been transmitted.

If there is only one control plane section applicable (block 604: no), the rule defined by the control plane section is stored in block 606 to the table for later use.

When the process ends, for the example illustrated in FIG. 4, the table will refer to beamID 7 for resource elements 0, 4, 8, 12, 16, 20, to beamID 5 for resource elements 1-3, 4-7, 9-12, and to beam ID 1 for resource elements 13-15, 17-19, 21-23.

Referring to FIG. 7, when the radio unit receives (block 701) data to be transmitted (within contiguous physical resource block (PRB) range), it processes the data by processing resource elements one by one. When a resource element is taken in block 702 to be processed, its position in the resource grid is determined in block 703. In other words, the resource element is identified. The position and the table are used in block 704 to select the processing rule. More precisely, based on the position, the processing rule is determined from the table. Then the data for the resource element is processed in block 705 according to the rule, for example using beamforming configuration indicated by the rule, and then sending of the data in the resource element is caused in block 705. If there are unprocessed resource elements (block 706: no), the process returns to block 702 to take another resource element to be processed. If all resource elements received in block 701 are processed (block 706: yes), data received in the contiguous physical resource block range has been transmitted (block 707).

Figure 8:
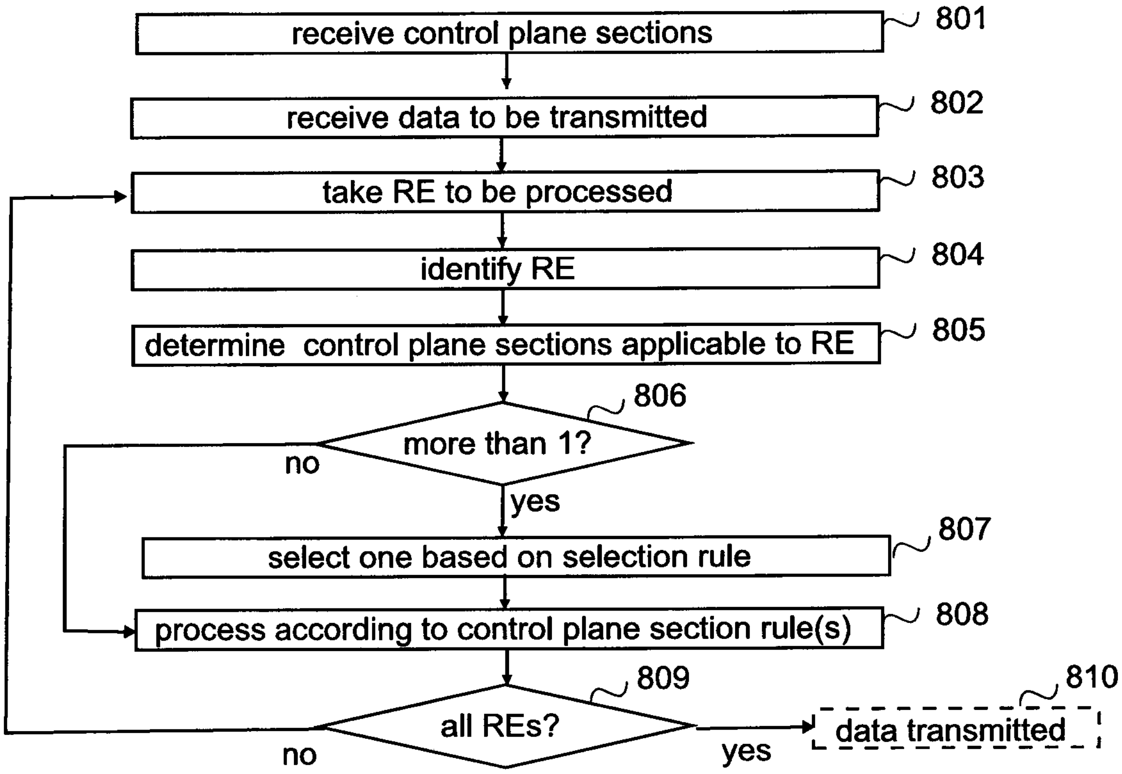

FIG. 8 illustrates a further example functionality of the radio unit. In the illustrated example, no separate selection table is prepared.

Referring to FIG. 8, the radio unit receives in block 801 a control plane message comprising three or more control plane sections, and after that the radio unit receives in block 802 a user plane message comprising data to be transmitted. The radio unit processes the data by processing resource elements one by one. When a resource element is taken in block 803 to be processed, the resource element is identified (its position in the resource grid is determined) in block 804. Then those control plane sections that are applicable to the resource element are determined in block 805. (In other words, all control plane sections within which resource element range the resource element locates are determined.) If there are more than one control plane sections applicable (block 806: yes), one of the control plane sections is selected in block 807, based on a selection rule, to be the control plane section whose definitions will be applied. For example, the one with the lowest priority value may be selected, or the one with a value being closest to a default value may be selected, or the one with the highest priority value may be selected. Then the data is processed in block 808 according to the one or more processing rules defined by the control plane section selected in block 807 and sending the processed data is caused (not separately shown in FIG. 8). If there are unprocessed resource elements (block 809: no), the process returns to block 803 to take another resource element to be processed. If all resource elements are processed (block 809: yes), data received has been transmitted (block 810).

As can be seen from the examples based on the solution disclosed with FIG. 4, it is possible to have multiple control plane sections that each describe beamforming configuration, for example, to be used in the same resource element, since the radio unit is configured to resolve the ambiguous situation by using the additional information, called herein priority, indicated in the control plane sections, to select which one is to be used. Further, since section identifiers are not used to find what control plane section is applicable, but instead resource elements are identified, the number of control plane sections can be minimized without affecting, for example, beamforming configuration applied by the radio unit.

The blocks, related functions, and information exchanges described above by means of FIGS. 5 to 8 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 9:
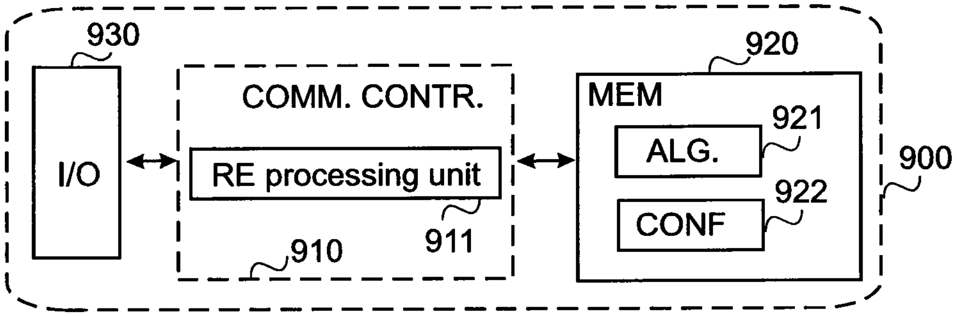
FIGS. 9 and 10 are schematic block diagrams.
Figure 10:
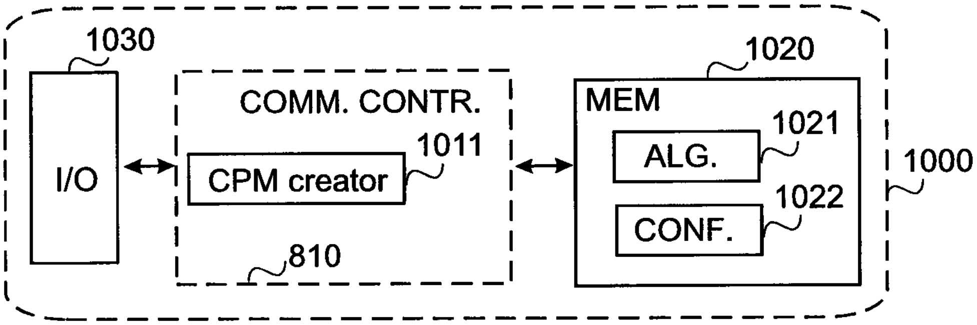

FIGS. 9 and 10 illustrate apparatuses comprising a communication controller 910, 1010 such as at least one processor or processing circuitry, and at least one memory 920, 1020 including a computer program code (software, algorithm) ALG. 921, 1021, wherein the at least one memory and the computer program code (software, algorithm) are configured, with the at least one processor, to cause the respective apparatus to carry out any one of the embodiments, examples and implementations described above. FIG. 9 illustrates an apparatus for the radio unit, and FIG. 10 illustrates an apparatus for the distributed unit. The apparatuses of FIGS. 9 and 10 may be electronic devices.

Referring to FIGS. 9 and 10, the memory 920, 1020 may be implemented using any suitable data storage technology, such as semiconductor based memory devices, flash memory, magnetic memory devices and systems, optical memory devices and systems, fixed memory and removable memory. The memory may comprise a configuration storage CONF. 921, 1021, such as a configuration database, for at least storing one or more configurations, including control plane sections and/or corresponding parameters/parameter values. The memory 921 may further store, at least temporarily, tables for determining processing rule(s) for a resource element and/or control plane sections. The memory 920, 1020 may further store a data buffer for data waiting to be processed (including transmission).

Referring to FIG. 9, the apparatus for the radio unit comprises a communication interface 930 comprising hardware and/or software for realizing communication connectivity according to one or more radio communication protocols. The communication interface 930 may provide the apparatus with communication capabilities to user devices (terminal devices) camping in one or more cells controlled by the distributed unit. In an embodiment, the communication interface may comprise one or more antenna arrays providing the apparatus with capability of forming directive transmission radio beams and the reception radio beams. The communication interface may comprise standard well-known components such as an amplifier, filter, frequency-converter, (de)modulator, and encoder/decoder circuitries and one or more antennas.

The communication controller 910 comprises a resource element (RE) processing circuitry 911 configured to process resource elements to be transmitted according to applicable processing rules. The resource element processing circuitry may, for example, configure the radio unit to perform resource element processing according to any one of the embodiments/examples/implementations described above. The communication controller 910 may control the resource element processing circuitry 911 to receive fronthaul control plane messages and to use them to determine control plane section to be used for a resource element.

Referring to FIG. 10, the apparatus 1000 may further comprise a communication interface 1030 comprising hardware and/or software for realizing communication connectivity according to one or more radio communication protocols. The communication interface 1030 may provide the apparatus with communication capabilities with radio units and to the backhaul and/or core network.

The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1010.

The communication controller 1010 comprises a control plane message (CPM) creator circuitry 1011 configured to create fronthaul control plane messages according to any one of the embodiments/examples/implementations described above. The control plane message creator circuitry 1011 may communicate the reserved resources to the radio units through the communication interface 1030.

In an embodiment, at least some of the functionalities of the apparatus of FIG. 10 may be shared between two physically separate devices, forming one operational entity. Therefore, the apparatus may be seen to depict the operational entity comprising one or more physically separate devices for executing at least some of the processes described with respect to the distributed unit.

As used in this application, the term ‘circuitry’ refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIG. 2 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art.

Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 5 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A radio unit comprising:

at least one processor; and at least one memory storing instructions that, when executed by the at least one processor, cause the radio unit at least to perform:

identifying, in response to receiving data to be transmitted, a resource element allocated for transmission of the data within a resource element range, the identifying including determining a position of the resource element in a resource grid;

determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane sections;

processing data according to one or more processing rules defined in the control plane section; and causing sending the data.

2. The radio unit of claim 1, wherein the instructions, when executed by the at least one processor, cause the radio unit further to perform:

creating, in response to receiving the fronthaul control plane message, for resource elements within the resource element range, a selection table, the selection table comprising for a resource element information on the one or more processing rules to apply, the one or more processing rules being determined by using the control plane section applicable in the resource element, or, if there are two or more control plane sections applicable in the resource element, one of the two or more control plane sections, the one being selected based on the priority values indicated in the two or more control plane sections; and storing to the selection table information indicating the one or more processing rules;

wherein the determining, based on the position and the received fronthaul control plane message, comprises determining the control plane section by selecting the one or more processing rules from the selection table based on the position.

3. The radio unit of claim 1, wherein the instructions, when executed by the at least one processor, cause the radio unit further to perform:

using the indicated priority values to select the one of the two or more control plane sections that has the highest priority value.

4. The radio unit of claim 1, wherein the instructions, when executed by the at least one processor, cause the radio unit further to perform:

using a default priority value if a control plane section does not comprise a priority value.

5. The radio unit of claim 1, wherein the one or more processing rules indicate beamforming configuration to be used.

6. An apparatus comprising:

at least one processor; and at least one memory storing instructions that, when executed by the at least one processor, cause the apparatus at least to perform:

causing sending from the apparatus fronthaul control plane messages to one or more radio units, a fronthaul control plane message comprising three or more control plane sections for channels within a resource element range, at least two of which control plane sections are applicable at least in one of resource elements within the resource element range, and at least one of the control plane sections comprises a priority value.

7. The apparatus of claim 6, wherein the instructions, when executed by the at least one processor, cause the apparatus further to perform:

creating a control plane section for a control data channel within the resource element range and one or more control plane sections for one or more user data channels within the resource element range, wherein the control plane section for the control data channel is applicable at least in one of the resource elements in a control plane section for a user data channel.

8. The apparatus of claim 6, wherein the instructions, when executed by the at least one processor, cause the apparatus further to perform:

adding the priority value as an argument to a field in a section extension type 6 of the control plane section.

9. The apparatus of claim 6, wherein the control plane sections comprise the same section identifier.

10. A method for a radio unit, the method comprising:

identifying, in response to receiving data to be transmitted, a resource element allocated for transmission of the data within a resource element range, the identifying including determining position of the resource element in a resource grid;

determining, based on the position and a received fronthaul control plane message, which comprises three or more control plane sections for channels within the resource element range, at least two of which control plane sections are applicable at least in one of resource elements within the resource element range, a control plane section which processing rules to apply for the resource element, the determining including selecting, if there are two or more control plane sections applicable in the resource element, one of the two or more control plane sections based on priority values indicated in the two or more control plane sections;

processing data according to one or more processing rules defined in the control plane section; and causing sending the data.

11. The method of claim 10, further comprising:

creating, in response to receiving the fronthaul control plane message, for resource elements within the resource element range, a selection table, the selection table comprising for a resource element information on the one or more processing rules to apply, the one or more processing rules being determined by using the control plane section applicable in the resource element, or, if there are two or more control plane sections applicable in the resource element, one of the two or more control plane sections, the one being selected based on the priority values indicated in the two or more control plane sections; and storing to the selection table information indicating the one or more processing rules;

wherein the determining, based on the position and the received fronthaul control plane message, comprises determining the control plane section by selecting the one or more processing rules from the selection table based on the position.

12. The method of claim 10, further comprising:

using the indicated priority values to select the one of the two or more control plane sections that has the highest priority value.

13. The method of claim 10, further comprising:

using a default priority value if a control plane section does not comprise a priority value.

14. The method of claim 10, wherein the one or more processing rules indicate beamforming configuration to be used.

* * * * *